United States Patent
Sasaki et al.

(10) Patent No.: US 6,745,633 B2
(45) Date of Patent: Jun. 8, 2004

(54) PRESSURE SENSOR WITH ELECTRICALLY CONDUCTIVE SPRING BODIES FOR CONNECTING AND FIXING CONNECTOR CASE AND PADS

(75) Inventors: Keiji Sasaki, Tokyo (JP); Hitoshi Nagase, Tokyo (JP); Isao Okura, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 108 days.

(21) Appl. No.: 10/224,318

(22) Filed: Aug. 21, 2002

(65) Prior Publication Data

US 2003/0107491 A1 Jun. 12, 2003

(30) Foreign Application Priority Data

Dec. 10, 2001 (JP) ........................................ 2001-375327

(51) Int. Cl.[7] ................................................ G01L 9/06
(52) U.S. Cl. ........................................................ 73/727
(58) Field of Search ............................ 73/715, 716, 717, 73/718, 719, 720, 721, 722, 723, 724, 725, 726, 727

(56) References Cited

U.S. PATENT DOCUMENTS 5,329,819 A * 7/1994 Park et al. ..................... 73/724
5,351,548 A * 10/1994 Briggs et al. .................. 73/718
5,581,023 A * 12/1996 Handfield et al. ......... 73/146.5
6,591,684 B2 * 7/2003 Babala et al. ................. 73/715

FOREIGN PATENT DOCUMENTS

| JP | 11-312611 | 11/1999 |
| JP | 11-351990 | 12/1999 |

* cited by examiner

Primary Examiner—William Oen
(74) Attorney, Agent, or Firm—Rader, Fishman & Grauer PLLC

(57) ABSTRACT

A pressure sensor 1' comprising a housing 10' having a pressure introduction hole 12, a pressure sensing element 22 composed of a semiconductor element having piezoresistance effect, a holder 30 having fixed thereto the pressure sensing element 22, a guide member 98, a seal member 99 and a connector case 70, the pressure sensor element 22 and holder 30 joined in airtight manner to create a reference pressure chamber 72. On the holder 30 of the pressure sensor body is mounted a circuit board 40 having electrode pads, the electrode pads connected to connectors 80 fixed to the connector case 70 via conductive spring bodies 50. The guide member 98 supports holder 30, and in the opening 100 of the guide member 98 is placed the seal member 99.

11 Claims, 9 Drawing Sheets

PRESSURE SENSOR WITH ELECTRICALLY CONDUCTIVE SPRING BODIES FOR CONNECTING AND FIXING CONNECTOR CASE AND PADS

FIELD OF THE INVENTION

The present invention relates to a pressure sensor, and more specifically, to a pressure sensor comprising a housing storing a pressure sensing element and a connector case, that can be assembled easily with reduced number of assembly steps.

DESCRIPTION OF THE RELATED ART

Japanese Laid-Open Provisional Publication No. 11-351990 discloses an absolute pressure type pressure sensor or a sealed gauge pressure type pressure sensor for detecting fluid pressure. The disclosed pressure sensor comprises a metal housing having an inner chamber communicated to a pressure sensing chamber and a thin wall rising portion at the upper end of the housing; a metal cylindrical pressure case having an inner chamber, a separation wall that divides the inner chamber into upper and lower space and a thin wall rising portion at the upper end of the case; and a connector case made of an insulating material; the housing, the pressure case and the connector case stacked with each rising portion caulked to form an integrated inner space for storing a sensor element for detecting pressure and an electric circuit, the pressure case further equipped with a penetrating condenser.

Further, the present applicant has filed an application (Japanese Patent Application No. 11-312611) related to a pressure sensor, the object of which is to reduce the influence of electromagnetic noise that may affect the output voltage of the pressure sensor. The disclosed pressure sensor comprises a housing having a pressure introduction hole, a sensor element composed of a semiconductor element having piezoresistance effect, a holder for fixing the sensor element, and a pressure case, wherein the sensor element, the holder and the pressure case are welded together as pressure sensor body in an airtight manner so as to create a reference pressure chamber, the pressure sensor body disposed within the housing in an insulated manner.

According to the above-mentioned invention, it is possible to reduce the influence of electromagnetic noise acting on the pressure sensor, but since the structure around the area where the pressure sensor body and the connector come into contact is complex, many steps are required to assemble the pressure sensor and the cost of manufacturing the sensor cannot be cut down.

SUMMARY OF THE INVENTION

The present invention is aimed at providing a pressure sensor that overcomes the prior art problems, with a simplified structure for connecting the pressure sensor body and the connector, requiring reduced number of assembly steps.

In order to achieve such object, the present pressure sensor comprises a housing having a pressure introduction hole, a pressure sensing element composed of a semiconductor element having piezoresistance effect, a holder to which the pressure sensing element is fixed, a connector case, a pressure sensor body creating a reference pressure chamber with the pressure sensing element and the holder bonded in an airtight manner, a circuit board having electrode pads mounted on the holder of the pressure sensor body, and electrically conductive spring bodies having elasticity for connecting connectors fixed to the connector case to the electrode pads.

According further to the present invention, one end of each spring body for connecting the connector to the electrode pad is fixed to the lower end of each connector, the other end being bent downward and the tip of the end forming a curved portion.

According further to the present invention, the area of the spring body from the portion fixed to the lower end of the connector to the area being bent downward is supported by the bottom portion of the inner chamber of the connector case.

According to the present invention, the pressure sensor is a gauge pressure type pressure sensor, but the reference pressure chamber can also be formed in an airtight manner using a pressure case, and the pressure sensor can be either an absolute pressure type or a sealed gauge pressure type pressure sensor.

According to another aspect of the present invention, the pressure sensor comprises a housing having a pressure introduction hole, a pressure sensing element composed of a semiconductor element having piezoresistance effect, a holder to which the pressure sensing element is fixed, a connector case, a pressure sensor body creating a reference pressure chamber with the pressure sensing element and the holder bonded in an airtight manner, a circuit board having electrode pads mounted on the holder of the pressure sensor body, electrically conductive spring bodies having elasticity for connecting connectors fixed to the connector case to the electrode pads, and a seal member mounted between the pressure sensing element and the housing, the size of the seal member determined so as to adjust the load received by the pressure sensing element.

According further to the present invention, the pressure sensor comprises a guide member having an opening formed to the center thereof mounted between the housing and the holder, the seal member disposed within the opening of the guide member.

According to the pressure sensor of the present invention having the characteristics mentioned above, a seal member is equipped between the pressure sensing element and the housing. Therefore, by adjusting the size of the seal member, the amount of fluid passing through the seal member from the housing toward the pressure sensing element can be controlled, and thereby, the increase of load received by the pressure sensing element can be effectively suppressed.

DETAILED DESCRIPTION OF THE PREFERRED EMBODIMENT

Figure 1:
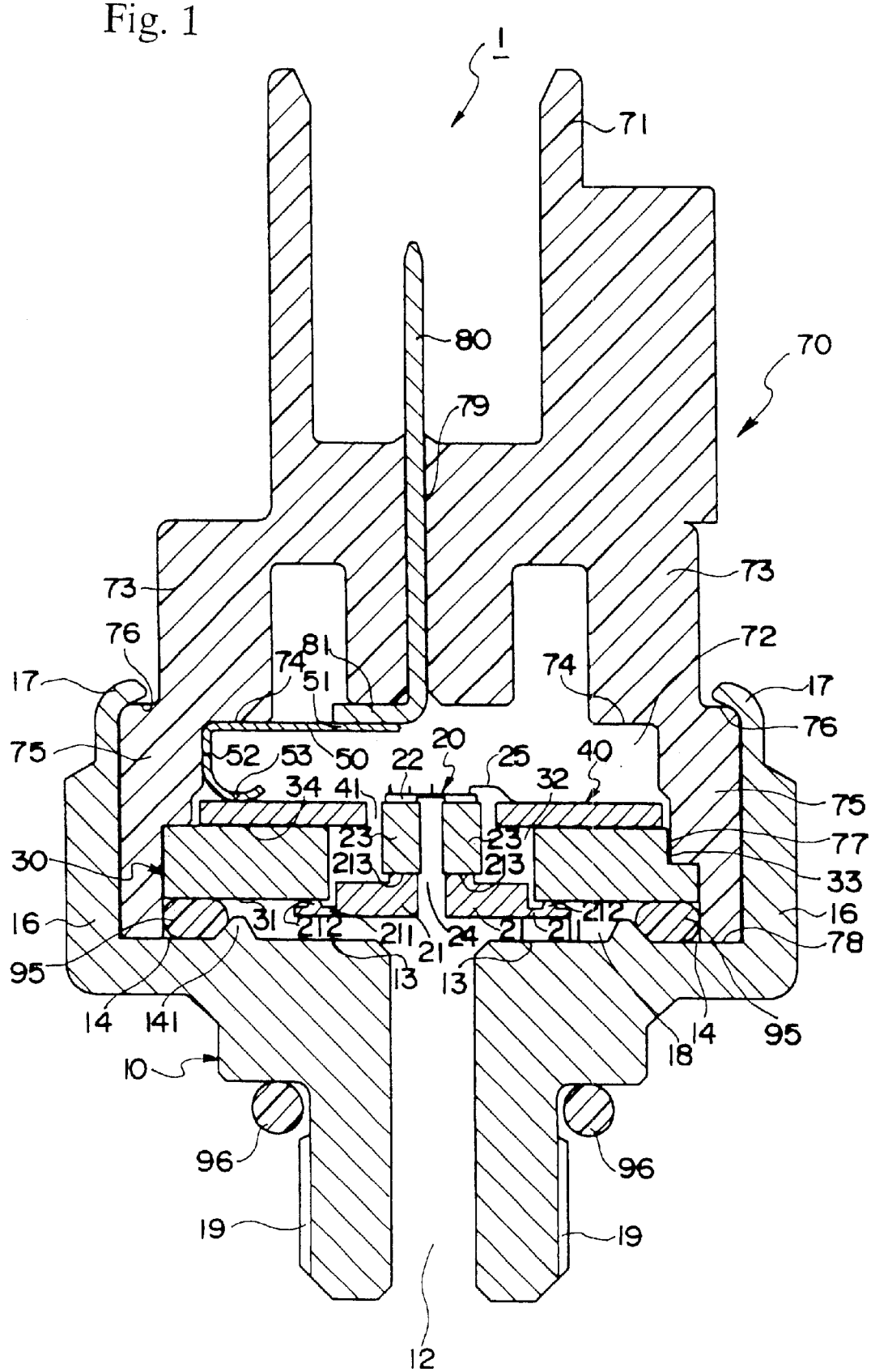
FIG. 1 is a vertical cross-sectional view showing the structure of the pressure sensor according to the first embodiment of the present invention.
Figure 2:
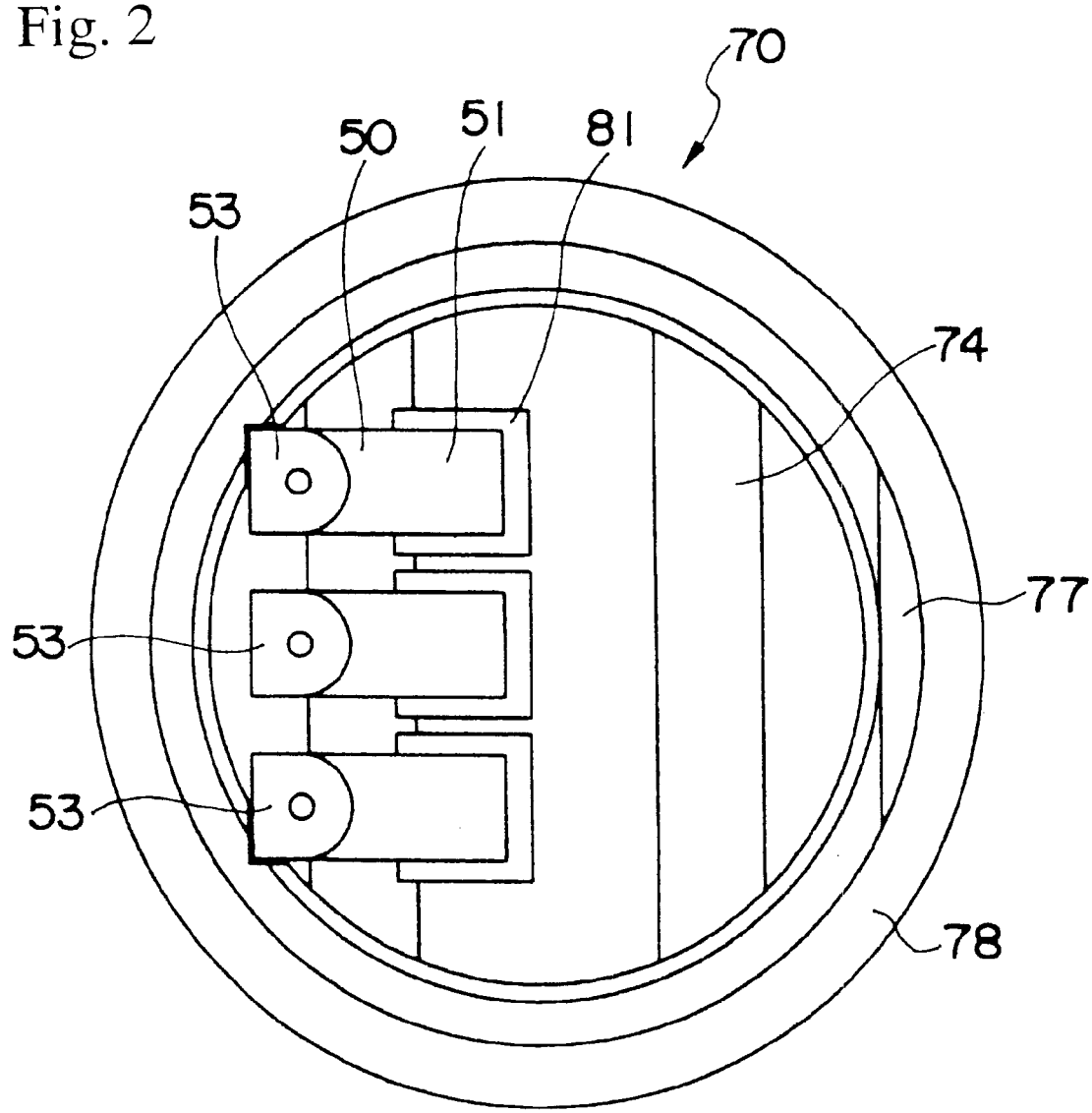
FIG. 2 is a bottom view of the connector case of the pressure sensor according to the first embodiment of the present invention.
Figure 3:
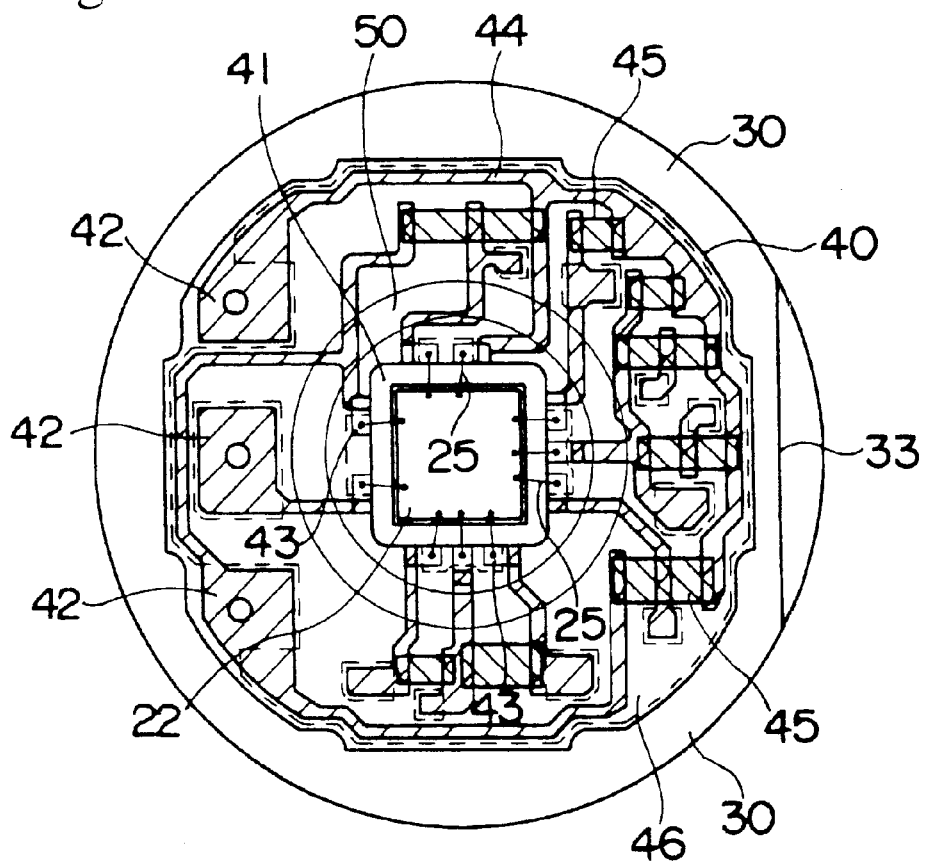
FIG. 3 is an upper view of the holder and circuit board of the pressure sensor according to the first embodiment of the present invention.
Figure 4:
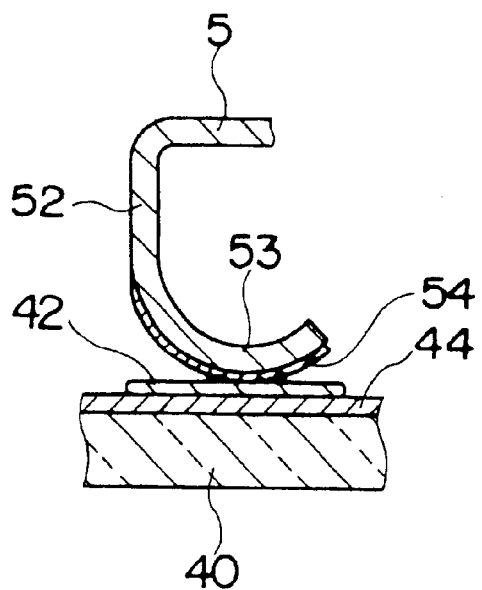
FIG. 4 is an enlarged cross-sectional view showing the electrode pad portion of the pressure sensor according to the first embodiment of the present invention.

We will now explain the first embodiment of the pressure sensor according to the present invention with reference to FIGS. 1 through 4. FIG. 1 is a vertical cross-sectional view showing the structure of a gauge pressure type pressure sensor according to the first embodiment of the present invention, FIG. 2 is an upper view of a circuit board and holder, FIG. 3 is a bottom view of a connector case, and FIG. 4 is a view explaining the connection between an electrode pad and a spring body.

A pressure sensor 1 according to the first embodiment of the invention comprises a housing 10, a sensor element 20, a holder 30, a circuit board 40, a spring body 50, a connector case 70, and connectors 80.

The pressure sensor 1 defines a container by the housing 10 and the connector case 70, inside which is stored the pressure sensor body composed of the sensor element 20 and the holder 30.

The housing 10 is formed for example using aluminum in a substantially cylindrical shape. The housing 10 comprises a fluid introduction hole 12 formed to the lower portion thereof for introducing fluid, a round housing bottom 13 formed to the upper portion of the fluid introduction hole, an annular groove 14 functioning as an o-ring and connector case receiver defined by an annular projection or bank 141 formed to the periphery portion thereof, a surrounding wall 16 rising from the outer periphery of the annular groove, a caulking portion 17 having a reduced thickness formed to the upper end of the surrounding wall, and a housing inner space 18 defined within the body by the bottom portion and the surrounding wall.

The fluid introduction hole 12 is communicated with the housing inner space 18 of the housing 10.

A screw portion 19 formed to the outer periphery of the fluid introduction hole 12 of the housing 10 is screwed onto a measurement pressure-side piping, and thus the housing 10 is fixed to the piping in an airtight manner.

The sensor element 20 for sensing pressure comprises a metal header 21, a pressure detector element 22 formed of a semiconductor element having plural resists with piezoresistance effects mounted to form a bridge circuit on the upper surface of the semiconductor substrate, and a silicon seat 23 fixed in an airtight manner on the upper surface of the header 21. At the center portion of the header 21 and the seat 23 is formed a sensor element opening 24 that reaches the bottom surface of the pressure sensing element 22.

On the upper surface 213 of the header 21 is mounted the seat 23 which is fixed to position in an airtight manner, and on the upper surface of the seat 23 is mounted the pressure sensing element 22 in an airtight manner with the surface having the resists placed as the upper surface.

At the lower periphery area of the header 21 is formed a collar portion 211 having a holder receiving bank 212 in the form of a closed circle on the upper surface thereof.

The pressure sensing element 22 is formed to include a semiconductor substrate surface having a square planar shape, and a thin center portion forming a diaphragm that deforms by pressure. On the upper surface of the diaphragm is created a pressure sensing portion in the form of a strain gauge, in which plural piezoresistance elements are mounted to form a bridge circuit. On the thick periphery portion are mounted electric circuits such as an arithmetic circuit and an amplifying circuit that are manufactured based on integrated circuit fabrication technology.

The land portion formed on the upper surface of the pressure sensing element 22 is connected via a bonding wire 25 to a land portion 43 formed on the upper surface of the circuit board 40.

According to one example, the silicon seat 23 has a square planar shape, with a sensor element opening 24 formed to the center thereof.

The bonding surface between the silicon seat 23 and the header 21 is provided with a gold plated layer formed for example by gold sputtering and the like.

The header 21 is composed for example using an iron-nickel alloy such as 42 alloy, having a round planar shape, with a sensor element opening 24 formed at the center thereof. The bonding surface between the header 21 and the seat 23 is provided with a gold plated layer.

The sensor element opening 24 of the seat 23 and the header 21 are coaxially arranged to communicate with the fluid introduction hole 12 of the housing 10, and formed to introduce the pressure fluid to the space formed to the back surface of the pressure sensing element 22.

The lower surface of the pressure sensing element 22 is welded onto the upper surface of the seat 23 in an airtight manner. A brazing material of gold-silicon is sandwiched between the lower surface of the seat 23 and the upper surface 213 of the header 21, to which is performed thermocompression bonding (scrub) so as to create a gold-silicon alloy which bonds the members in an airtight manner.

The holder 30 together with the connector case 70 defines a reference pressure chamber.

The holder 30 is formed for example of stainless steel, having a holder opening 32 formed to the center thereof and a positioning notch 33 formed to a portion of the rim area for determining the position of the connector case.

The lower surface 31 of the holder 30 comes into contact with the upper surface of the holder receiving bank 212 formed to the collar portion 211 of the header 21 of the sensor element 20, which are fixed in an airtight manner for example through projection welding.

A circuit board 40 is fixed to the upper surface 34 of the holder 30 using a bond and the like.

Circuit board 40 comprises an insulation printed circuit board formed for example of alumina substrate, which is formed substantially in a disc shape with a circuit board opening 41 formed to the center thereof to which is positioned the pressure sensing element 22 of the sensor element 20. On the surface of the circuit board are formed electrode pads 42 made of gold pads for taking out signals to the exterior, a land portion 43 made of a gold pad to which is connected the bonding wire 25 from the pressure sensing element 22, a printed wire 44 and circuit elements 45 constituting a circuit that amplifies, processes and outputs the electric signals from the pressure sensing element 22.

The circuit portion of the circuit board 40 excluding the electrode pads 42, the land portion 43 and the sensing terminal portion is covered with a protective coating 46, as shown by the dashed line in FIG. 3.

The electrode pads 42 formed on the circuit board 40 functioning as input/output terminals are connected with connectors 80 through spring bodies 50. The pads 42 are formed to correspond to signal wire, power supply wire and grounding wire.

Each spring body 50 is made of a conductive elastic body such as phosphor bronze, one end 51 of which is fixed to a lower end 81 of one connector 80 by spot welding and the like and the other end of which being bent downward to form a dropped portion 52, at the very end of which is formed a curved portion 53. The surface of the curved portion 53 coming into contact with the electrode pad 42 is partially provided with a gold plate 54.

The portion starting from the end 51 to the bent portion 52 of the spring body 50 is supported by the bottom surface 74 of the connector case 70, and the spring functions so that the curved portion 53 is pressed onto the electrode pad 42 when the connector case 70 is fit onto the housing 10.

The connector case 70 is a resin case to which the connectors 80 are inserted and fixed. The connector case 70 comprises a socket portion 71 formed to the upper area of the case, a connector case inner chamber 72 formed below the socket portion 71 functioning as the reference chamber, an upper surrounding wall 73 that extends downward, a lower surface 74 of the upper surrounding wall 73, a lower surrounding wall 75 extending below the upper surrounding wall 73, a caulking receiver 76 formed to the upper outer area of the lower surrounding wall 75, a positioning portion 77 formed to the inner side of the lower surrounding wall 75, a flat surface 78 formed to the lower end of the lower surrounding wall 76, and a connector inserting hole 79 for inserting and supporting the connectors 80. The connectors 80 are inserted from the lower direction of the connector inserting hole 79 and fixed thereto.

Though not shown, the pressure within the reference chamber is communicated with the exterior (atmospheric pressure) through the gap (pressure equalizing passage) between the connector 80 and connector inserting hole 79, thereby achieving a gauge pressure type pressure sensor. Of course, the pressure equalizing passage can have the minimum size through which pressure is transmitted.

This connector case 70 can be designed in various forms so as to correspond to various types of connectors.

Of the connectors 80, the power wire and the grounding wire are used to supply power to the electric circuit, and the grounding wire and the signal wire are used to take out the output signals of the sensor element 20 to the exterior.

An o-ring 95 is inserted to an annular groove 14 which functions as an o-ring receiving groove, to prevent water, moisture and the like from entering the inner space 72 of the connector case 70 from the exterior. Another o-ring 96 is fit to the area above the screw portion 19 of the housing maintaining an airtight relation with the piping.

We will now explain the procedure for assembling the pressure sensor 1 using these components.

The sensor element 20 assembled by fixing a layered body composed of the pressure sensing element 22 and the seat 23 on the header 21 is inserted to the holder opening 32 of the holder 30 so that the upper surface of the holder receiving bank 212 formed to the collar portion 211 of the header 21 comes into contact with the lower surface 31 of the holder, and the annular projection electrode is pressed thereon so as to weld the lower holder surface 31 onto the header 21 in an airtight manner.

Then, the circuit board 40 is bonded onto the upper surface 34 of the holder 30 using an adhesive, and the land portion of the pressure sensing element 22 is connected to the land portion 43 of the circuit board 40 using a bonding wire 25 formed of a gold wire.

The pressure sensor assembly composed of the sensor element 20, the holder 30 and the circuit board 40 is then mounted within the housing inner chamber 18 of the housing 10 having the o-ring 95 equipped thereto. The connectors 80 having the spring body 50 fixed to the lower end portion 81 thereof are inserted to the connector inserting hole 79 of the connector case 70, thus assembling the connector case 70 having a connecting means equipped thereto.

Next, after positioning the connector case 70 so that the curved portions 53 of the spring bodies 50 fixed to the connectors 80 inserted to the connector case 70 are positioned above the electrode pads 40 of the circuit board 40, the connector case 70 is inserted to the inner chamber 18 of the housing 10, and the caulking portion 17 at the upper end of the surrounding wall 16 of the housing 10 is fit onto the caulking receiving portion 76 of the connector case 70, thus fixing the connector case 70 to the housing 10.

By the above-mentioned steps, the pressure sensor 1 having the connectors 80 electrically connected to the electrode pads 42 is assembled.

According to the present invention, the pressure sensor assembly is disposed within the housing 10 before the connector case 70 is covered from above and the housing is caulked onto position, the structure enabling a gauge pressure type pressure sensor comprising an airtight fluid introduction space to be manufactured with ease without the need of a soldering step for connecting lead wires and the like.

The second embodiment of the present invention relates to a pressure sensor of the absolute pressure and sealed gauge pressure type, instead of the gauge pressure sensor according to the first embodiment.

Figure 5:
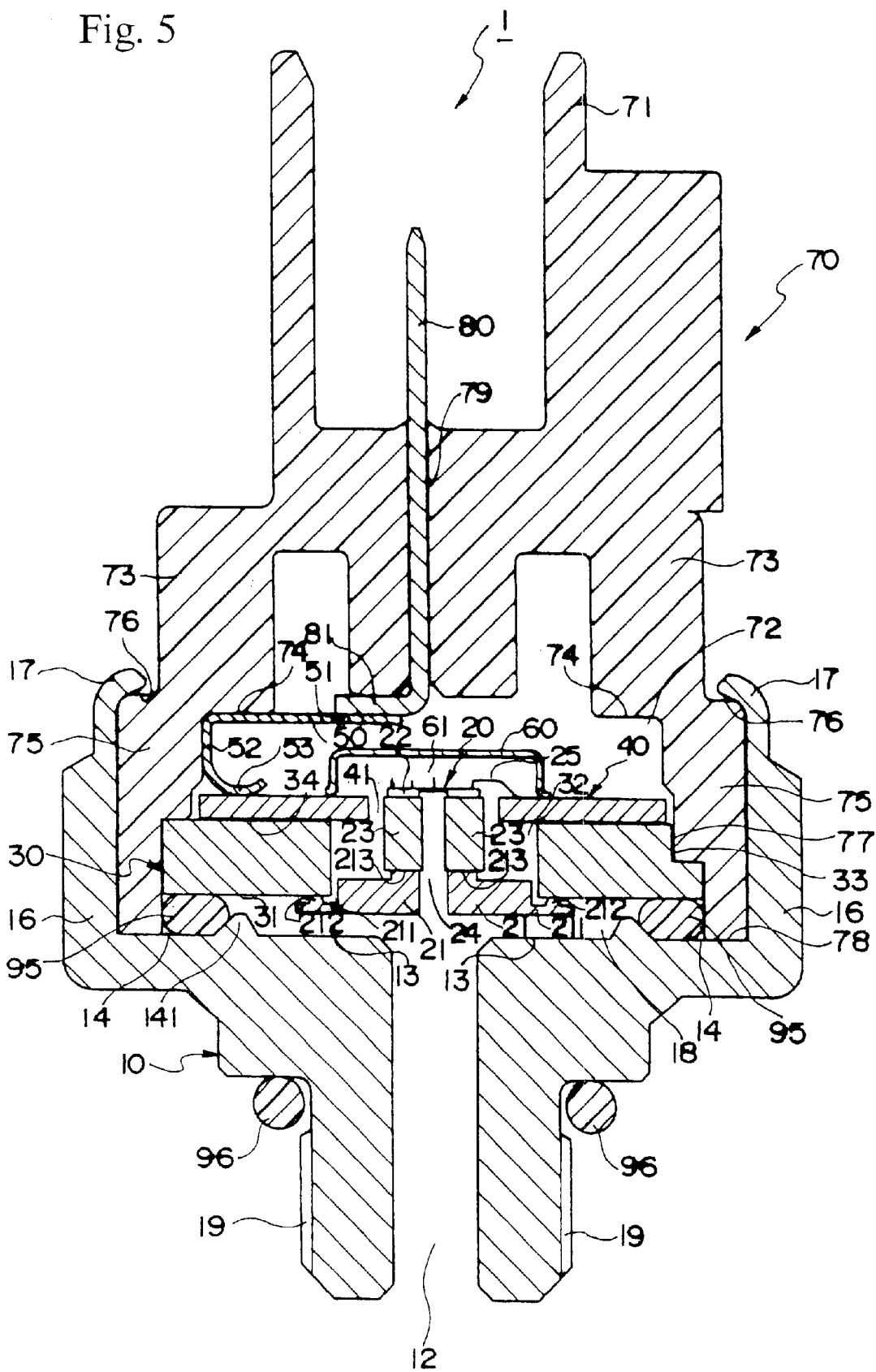
FIG. 5 is a vertical cross-sectional view showing the structure of the pressure sensor according to the second embodiment of the invention.

The absolute pressure and sealed gauge pressure sensor 1 according to the second embodiment of the present invention will be explained with reference to FIGS. 5 and 6. FIG. 5 is a vertical cross-sectional view showing the whole body of the pressure sensor, and FIG. 6 is an enlarged cross-sectional view of the mounting portion of the pressure case of the absolute pressure and sealed gauge pressure sensor.

The pressure sensor 1 according to the second embodiment of the present invention characterizes in comprising a pressure case 60 disposed in an airtight manner on the gauge pressure sensor 1 according to the first embodiment of the present invention shown in FIG. 1, the inner space of the pressure case 60 functioning as a reference pressure chamber, the inner space 61 maintained either in vacuum condition or at a predetermined gas pressure so as to detect the absolute pressure or the sealed gauge pressure. Furthermore, by forming the pressure case 60 with a metal member, the case can reduce the high-frequency electromagnetic noise reaching the sensor element 20 from the exterior.

Figure 6:
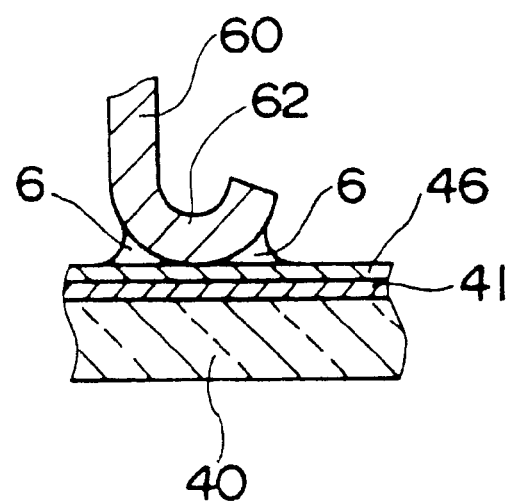
FIG. 6 is an enlarged cross-sectional view showing the connection of the pressure case of the pressure sensor according to the second embodiment of the invention.

An inner space or chamber 61 is formed in the pressure case 60, and as shown in FIG. 6, the inner chamber 61 is maintained at a predetermined pressure. The periphery 62 of the pressure case 60 is bonded onto the insulating protection film 46 composed of a glass layer formed on the upper surface of the circuit board 40 with a silicon adhesive 62 in an airtight manner.

As for the other members, the pressure sensor 1 according to the second embodiment of the present invention is formed similarly as the gauge pressure sensor 1 of the first embodiment.

Similar to the first embodiment, the pressure sensor 1 according to the second embodiment can also be manufactured easily without the need for soldering steps and the like.

Figure 7:
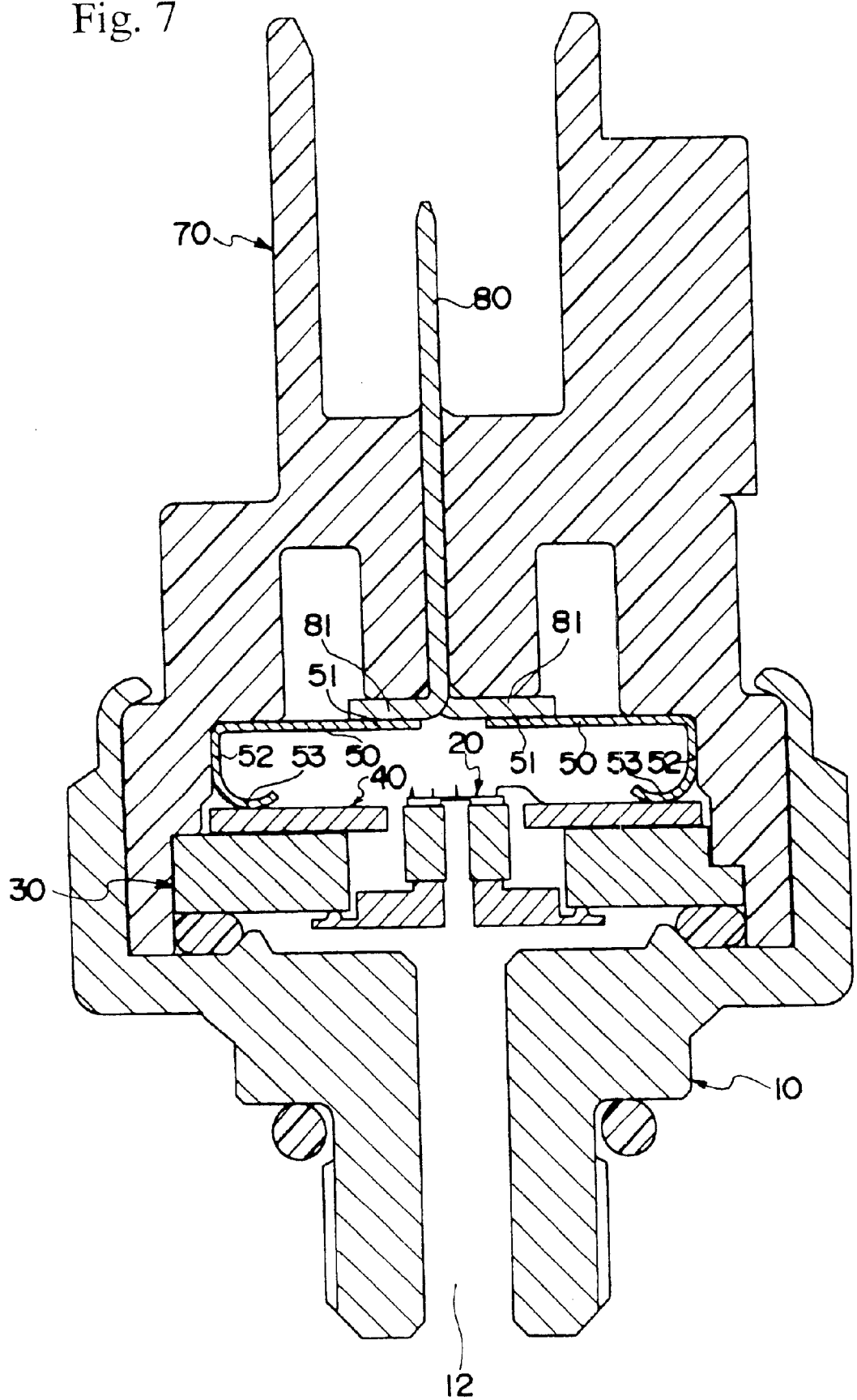
FIG. 7 is a vertical cross-sectional view showing the structure of the pressure sensor according to the third embodiment of the invention.
Figure 8:
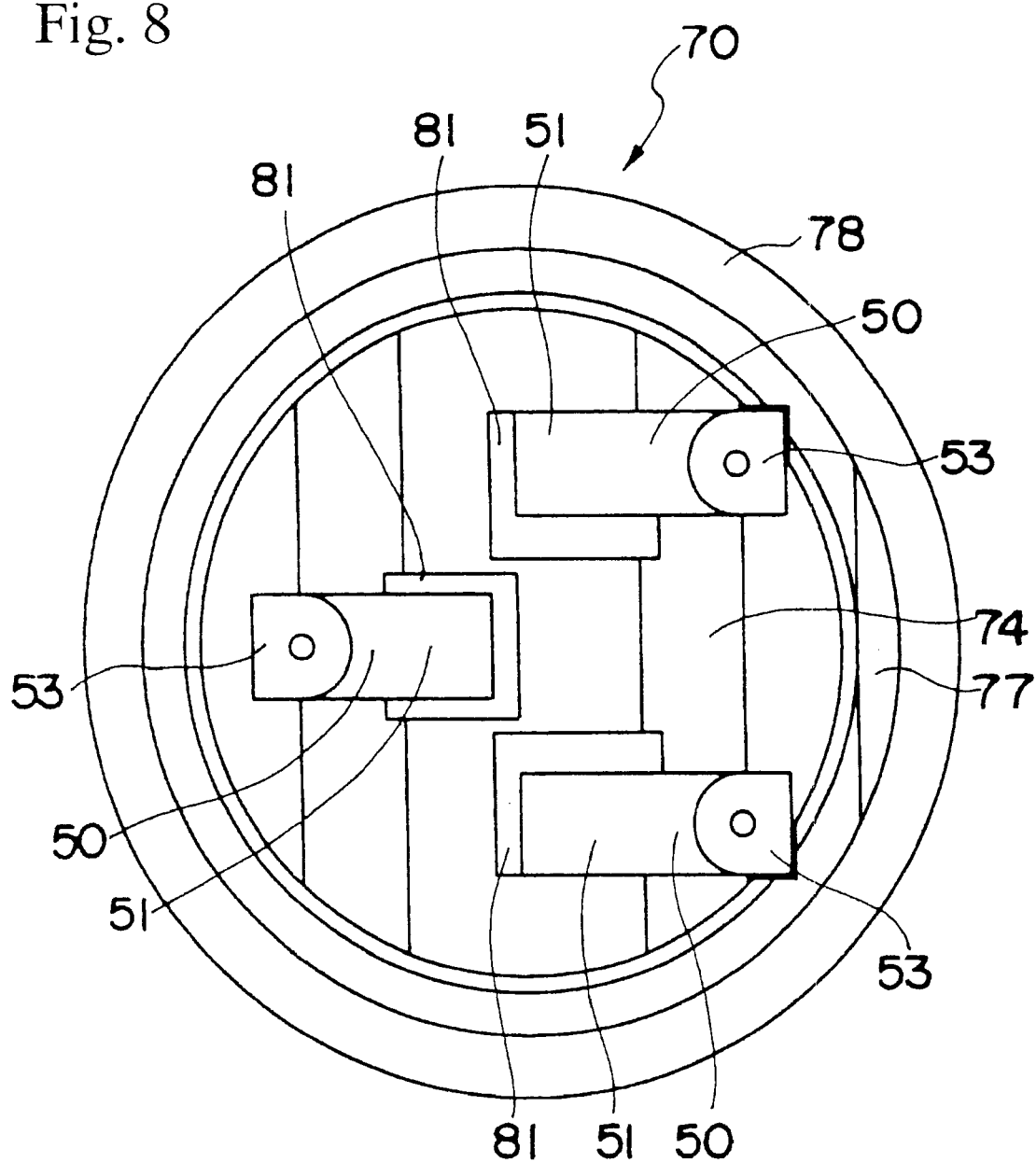
FIG. 8 is a bottom view of the connector case of the pressure sensor according to the third embodiment of the invention.

The gauge pressure sensor 1 according to the third embodiment of the present invention will be explained with reference to FIGS. 7 and 8. FIG. 7 is a vertical cross-sectional view showing the gauge pressure sensor according to the third embodiment of the invention, and FIG. 8 is a bottom view of the connector case.

The pressure sensor 1 according to the third embodiment of the present invention is characterized in that in the gauge pressure sensor 1 of embodiment 1 shown in FIG. 1, the connectors 80 and spring bodies 50 fixed to the connector case 70 are divided toward right and left directions, and positioned in staggered relations.

The spring bodies 50 each connected to connectors 80 are divided into two groups, one group extended toward the right and the other extended toward the left with the connectors located at staggered positions, so that when the connector case 70 is mounted to the housing 10 storing the sensor assembly, the connector case 70 is stabilized and the caulking procedure that follows can be performed with ease.

The pressure sensor according to the present embodiment can be utilized even when the fluid to be detected has high pressure, such as when detecting the refrigerant pressure of a natural refrigeration system such as carbon dioxide gas.

A pressure sensor 1' suited for application to such use according to the fourth embodiment of the present invention will now be explained with reference to the vertical cross-sectional view of FIG. 9. The pressure sensor 1' according to the fourth embodiment of the invention is characterized in that in the variation of pressure sensor 1 of the first embodiment shown in FIG. 1, the high-pressure refrigerant is introduced to the detector element so as to detect the pressure thereof. According to the fourth embodiment shown in FIG. 9, the annular groove 14, the annular bank 141 and the o-ring 95 are excluded from the pressure sensor 1 according to the embodiment of FIG. 1, and instead, a guide member 98 having an opening at the center thereof and a seal member 99 disposed within the opening are equipped thereto. All the other elements are the same as those in the embodiment shown in FIG. 1, so the same elements are provided with the same reference numbers and the detailed explanations thereof are omitted.

Figure 9:
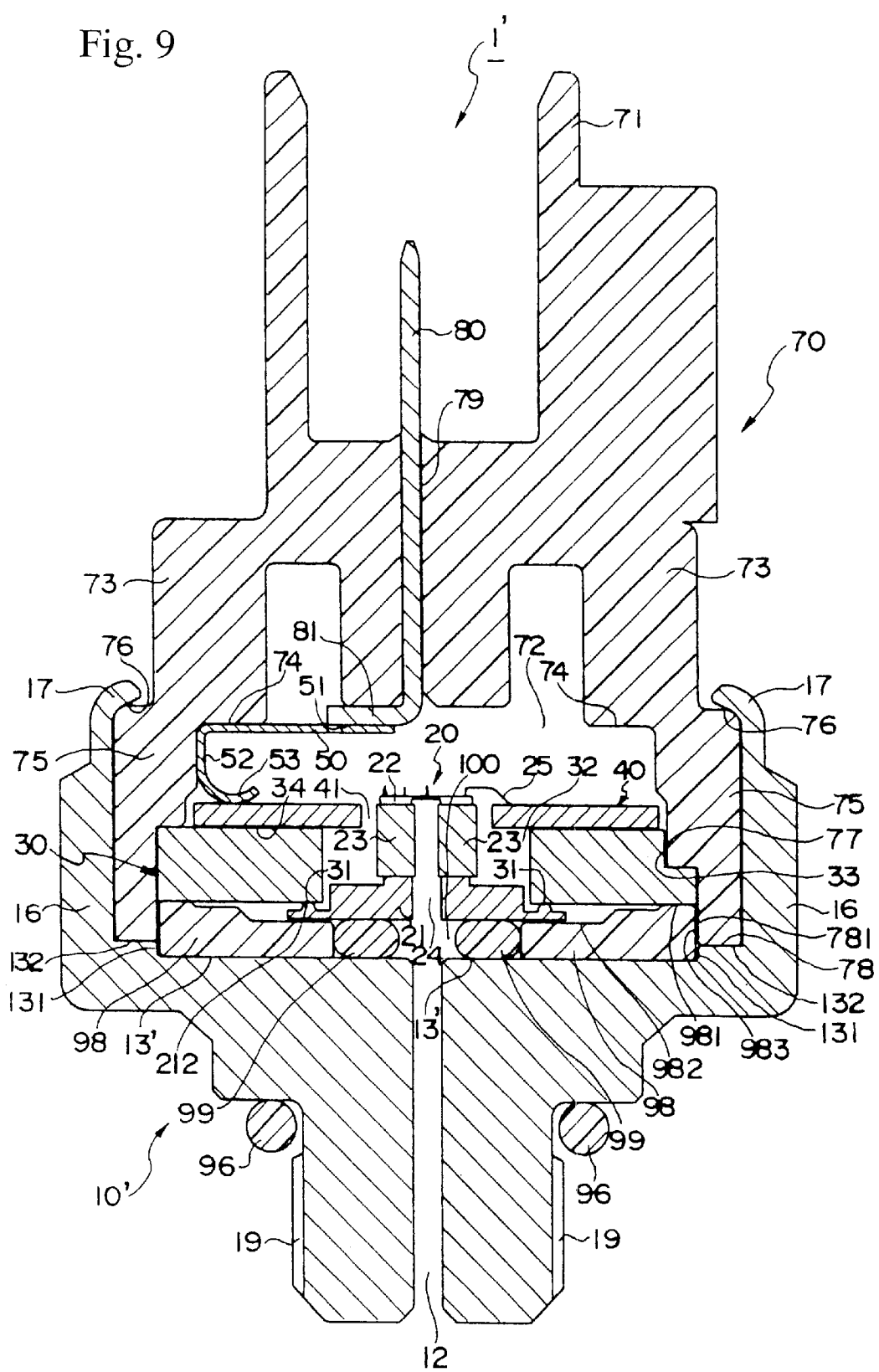
FIG. 9 is a vertical cross-sectional view showing the structure of the pressure sensor according to the fourth embodiment of the invention.

According to FIG. 9, a housing 10' is provided with a recess 131 formed to a bottom 13' of the circular housing, and in the recess 131 is mounted a guide member 98. The guide member 98 is formed to have a disc shape using resin for example, and at the center portion thereof is formed an opening 100. Inside the opening 100 of the guide member 98 is inserted a seal member such as an o-ring 99. The seal member functions both as a member providing airtight seal and as an insulator insulating the header 21 and the housing 10'. The o-ring 99, the opening 100, the introduction hole 12 and the sensor element opening 24 are arranged cocentrically, and communicated with each other. On the upper surface 981 of the guide member 98 is mounted a holder 30, and similar to the embodiment of FIG. 1, the upper surface of the holder receiving bank 212 of the header 21 and the lower surface 31 of the holder 30 are bonded by projection welding.

Thus, the header 21 is positioned on a step portion 982 of the guide member 98 and the o-ring 99.

As for the connection between the connector case 70 and housing 10', the positioning portion 77 of the lower surrounding wall 75 is positioned to the holder 30 and the flat surface 78 of the lower surrounding wall 75 comes into contact with the step portion 132 formed around the recess 131 of housing 10', the inner face 781 of the lower surrounding wall 75 comes into contact with the outer periphery 983 of the guide member 98, and the caulking portion at the upper end of the surrounding wall 16 is caulked to fix the case 70 to the housing.

According to such structure, the high-pressure refrigerant introduced through the fluid introduction hole 12 travels through the o-ring 99 and sensor element opening 24 into the space created to the back side of the pressure sensing element 22 by which pressure is detected and measured. At this time, since the o-ring 99 functioning as the seal member is disposed within the opening 100 of the guide member 98, the inner diameter of the o-ring 99 can be reduced by design, and the area of the fluid path formed by the o-ring 99 can be reduced. As a result, the flow of the high-pressure refrigerant can be reduced, thereby suppressing increase of the pressure loaded to the sensor element 20 caused by the increase in measurement pressure.

Further, the pressure sensor 1' according to the embodiment shown in FIG. 9 is not only suited for measurement of pressure of high-pressure refrigerants, but can also be applied to measuring other high-pressure fluid such as the hydraulic pressure of a hydraulic power unit.

Moreover, the guide member and o-ring shown in FIG. 9 can not only be applied to the embodiment of FIG. 1 but also to the embodiments of FIG. 5 and FIG. 7 to form a pressure sensor having the advantages of the one shown in FIG. 9.

Figure 10:
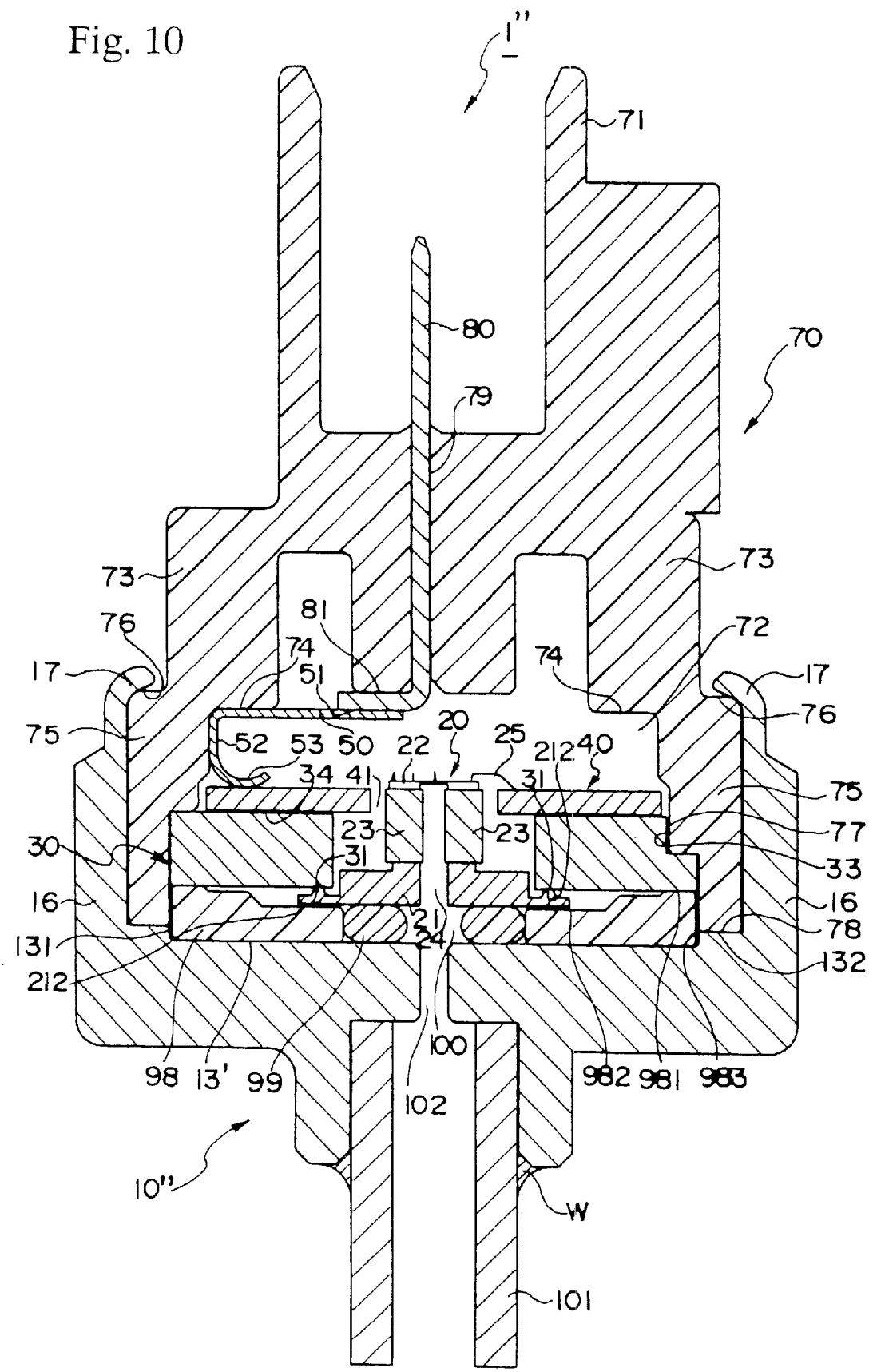
FIG. 10 is a vertical cross-sectional view showing the structure of the pressure sensor according to the fifth embodiment of the invention.

With reference to FIG. 10 showing the vertical cross-sectional view of a pressure sensor, the fifth embodiment of the pressure sensor according to the present invention will be explained. A pressure sensor 1" shown in FIG. 10 is characterized in that it comprises a fluid introduction pipe instead of the fluid introduction hole 12 formed to the housing 10' of the pressure sensor according to the fourth embodiment in FIG. 9.

In FIG. 10, reference 101 denotes a fluid introduction pipe and 102 shows a passage. Only this pipe and passage differ from the embodiment of FIG. 9, and other components are the same as the pressure sensor of FIG. 9, so the same components are provided with the same reference numbers, omitting the detailed descriptions thereof. In the drawing, the fluid introduction pipe 101 is made for example of copper, which is welded onto the housing 10" by brazing and the like. The pipe 101 is brazed at weld portion W to the housing 10". The passage 102 is a passage formed to the center of housing 10", which is arranged cocentrically with the opening 100 of the guide member 98, the sensor element opening 24 and the pipe 101, wherein the pipe 101, passage 102, opening 100 and sensor element opening 24 are communicated with one another.

According to such configuration, the high-pressure refrigerant introduced through the fluid introduction pipe 101 travels through the passage 102, o-ring 99 and sensor element opening 24 into the space formed to the back surface of the pressure sensing element 22, by which pressure is detected and measured. Thus, similar to the embodiment of FIG. 9, according to the embodiment of FIG. 10, the inner diameter of the o-ring 99 can be reduced so as to suppress the increase of pressure loaded on the sensor element 20 caused by the increase in measurement pressure.

As explained above, the present invention provides a gauge pressure sensor having reduced and simplified assembling steps realized by utilizing spring bodies having electrical conductivity and elasticity to connect the pressure sensor body with the connectors. Even further, the present invention also provides an absolute pressure and sealed gauge pressure sensor by disposing a pressure case within the sensor assembly.

Moreover, the present invention provides a pressure sensor that is capable of suppressing the increase of pressure loaded on the sensor element even when detecting and measuring fluid having high pressure.

What is claimed is:

1. A pressure sensor comprising:

a housing having a pressure introduction hole;

a pressure sensing element composed of a semiconductor element having piezoresistance effect;

a holder to which said pressure sensing element is fixed;

a connector case;

a pressure sensor body creating a reference pressure chamber with said pressure sensing element and said holder bonded in an airtight manner;

a circuit board having electrode pads mounted on the holder of said pressure sensor body; and electrically conductive spring bodies having elasticity for connecting connectors fixed to said connector case to said electrode pads.

2. A pressure sensor according to claim 1, wherein one end of each said spring body for connecting the connector to the electrode pad is fixed to the lower end of each connector, the other end being bent downward and the tip of said end forming a curved portion.

3. A pressure sensor according to claim 1, wherein one end of each said spring body for connecting the connector to the electrode pad is fixed to the lower end of each connector, the other end being bent downward and the tip of said other end forming a curved portion, and the area of the spring body from the portion fixed to the lower end of the connector to the area being bent downward is supported by the bottom portion of the inner chamber of the connector case.

4. A pressure sensor according to claim 1, wherein said pressure sensor is a gauge-pressure-type pressure sensor.

5. A pressure sensor according to claim 1, wherein the reference pressure chamber is formed in an airtight manner using a pressure case, and the pressure sensor is either an absolute-pressure-type or a sealed-gauge-pressure-type pressure sensor.

6. A pressure sensor comprising:

a housing having a pressure introduction hole;

a pressure sensing element composed of a semiconductor element having piezoresistance effect;

a holder to which said pressure sensing element is fixed;

a connector case;

a pressure sensor body creating a reference pressure chamber with said pressure sensing element and said holder bonded in an airtight manner;

a circuit board having electrode pads mounted on the holder of said pressure sensor body;

electrically conductive spring bodies having elasticity for connecting connectors fixed to said connector case to said electrode pads; and a seal member mounted between said pressure sensing element and said housing, the size of said seal member determined so as to adjust the load received by said pressure sensing element.

7. A pressure sensor according to claim 6, further comprising a guide member having an opening formed to the center thereof mounted between said housing and said holder, said seal member disposed within said opening of the guide member.

8. A pressure sensor according to claim 6, wherein one end of each said spring body for connecting the connector to the electrode pad is fixed to the lower end of each connector, the other end being bent downward and the tip of said end forming a curved portion.

9. A pressure sensor according to claim 6, wherein one end of each said spring body for connecting the connector to the electrode pad is fixed to the lower end of each connector, the other end being bent downward and the tip of said other end forming a curved portion, and the area of the spring body from the portion fixed to the lower end of the connector to the area being bent downward is supported by the bottom portion of the inner chamber of the connector case.

10. A pressure sensor according to claim 1, wherein said pressure sensor is a gauge pressure type pressure sensor.

11. A pressure sensor according to claim 1, wherein the reference pressure chamber is formed in an airtight manner using a pressure case, and the pressure sensor is either an absolute pressure type or a sealed gauge pressure type pressure sensor.

* * * * *